US012691408B2

(12) United States Patent
Molter et al.

(10) Patent No.: US 12,691,408 B2
(45) Date of Patent: Jul. 28, 2026

(54) METHOD OF PURIFYING HELIUM FROM MIXED GAS

(71) Applicant: SKYRE, INC., East Hartford, CT (US)

(72) Inventors: Trent M. Molter, South Windsor, CT (US); Robert Roy, West Springfield, MA (US)

(73) Assignee: SKYRE, INC., East Hartford, CT (US)

( * ) Notice: Subject to any disclaimer, the term of this patent is extended or adjusted under 35 U.S.C. 154(b) by 1179 days.

(21) Appl. No.: 17/640,832

(22) PCT Filed: Sep. 8, 2020

(86) PCT No.: PCT/US2020/049644
§ 371 (c)(1),
(2) Date: Mar. 7, 2022

(87) PCT Pub. No.: WO2021/046505
PCT Pub. Date: Mar. 11, 2021

(65) Prior Publication Data
US 2022/0339578 A1     Oct. 27, 2022

Related U.S. Application Data

(60) Provisional application No. 62/896,119, filed on Sep. 5, 2019.

(51) Int. Cl.
*B01D 53/32*     (2006.01)
*B01D 53/047*     (2006.01)
(Continued)

(52) U.S. Cl.
CPC ......... *B01D 53/326* (2013.01); *B01D 53/047* (2013.01); *B01D 53/229* (2013.01); *B01D 61/422* (2013.01); *C25B 15/083* (2021.01)

(58) Field of Classification Search
CPC .. B01D 53/326; B01D 53/047; B01D 53/229; B01D 61/422; B01D 53/22;
(Continued)

(56) References Cited

U.S. PATENT DOCUMENTS

| | | | | |
|---|---|---|---|---|
| 5,632,803 A | * | 5/1997 | Stoner | C01B 23/0052 |
| | | | | 95/143 |
| 2004/0151957 A1 | | 8/2004 | Brooks et al. | |

(Continued)

FOREIGN PATENT DOCUMENTS

WO     WO-2017124112 A1 *   7/2017   ........... B01D 53/326

OTHER PUBLICATIONS

International Search Report; International Application No. PCT/US2020/049644; International Filing Date: Sep. 8, 2020; Date of Mailing: Nov. 23, 2020; 4 pages.

(Continued)

*Primary Examiner* — Bryan D. Ripa
(74) *Attorney, Agent, or Firm* — CANTOR COLBURN LLP

(57) ABSTRACT

In an aspect, a hydrogen separation unit includes an electrochemical cell stack that includes a separator stack located in between an anode side and a cathode side; a mixed gas conduit for receiving a mixed gas stream to the anode side; an anode removal conduit for removing a helium rich stream from the anode side; and a cathode removal conduit for removing a hydrogen rich stream from the cathode side. The separation stack includes a plurality of electrochemical cells, each of which includes a proton exchange membrane located in between an anode and a cathode. The proton exchange membrane can include a cation. The separation stack can be a cascading separation stack.

11 Claims, 1 Drawing Sheet

(51) Int. Cl.
> B01D 53/22 (2006.01)
> B01D 61/42 (2006.01)
> C25B 15/08 (2006.01)

(58) Field of Classification Search
> CPC ............ B01D 2256/16; B01D 2257/11; B01D 2325/14; B01D 61/50; B01D 2325/42; C25B 15/083; C25B 1/02; C25B 9/75; C25B 13/02; C25B 13/08; Y02E 60/36
> See application file for complete search history.

(56) References Cited

U.S. PATENT DOCUMENTS

| | | | |
|---|---|---|---|
| 2009/0139874 A1 | 6/2009 | Peter et al. | |
| 2010/0101410 A1* | 4/2010 | Prasad | C01B 3/505 |
| | | | 95/53 |
| 2010/0200396 A1 | 8/2010 | Le Gallo | |
| 2010/0243475 A1* | 9/2010 | Eisman | B01D 53/326 |
| | | | 204/252 |
| 2015/0001092 A1* | 1/2015 | Preston | C25B 15/02 |
| | | | 205/637 |
| 2016/0024665 A1 | 1/2016 | Blanchet | |
| 2016/0129780 A1 | 5/2016 | Mcalister | |
| 2019/0024247 A1* | 1/2019 | Preston | C25B 15/08 |

OTHER PUBLICATIONS

Written Opinion; International Application No. PCT/US2020/049644; International Filing Date: Sep. 8, 2020; Date of Mailing: Nov. 23, 2020; 9 pages.

* cited by examiner

METHOD OF PURIFYING HELIUM FROM MIXED GAS

CROSS REFERENCE TO RELATED APPLICATIONS

This application is a National Stage application of PCT/US2020/049644, filed Sep. 8, 2020, which claims the benefit of U.S. Provisional Patent Application Ser. No. 62/896,119 filed Sep. 5, 2019. The related applications are incorporated herein in its entirety by reference.

BACKGROUND

With ever increasing advancements in technology, the demand for helium has been increasing, finding more and more uses in medical applications, the defense industry and scientific research. According to some forecasts, the global demand for helium will have an annual growth rate of around 6% and its total yearly demand could reach almost 3 billion cubic meters. It is projected that, in view of the increasing demand and decreasing supply, helium shortages to meet the demands could be as much as 1.6 billion cubic meters by 2030. One of the main sources of helium is from natural gas. Several methods are currently being used to purify helium from natural gas including cryogenic and non-cryogenic methods, with specific methods including pressure swing adsorption and membrane separation.

Improved methods of purifying helium from natural gas are therefore desired.

BRIEF SUMMARY

Disclosed herein is a method of purifying helium from mixed gas.

In an aspect, a hydrogen separation unit includes an electrochemical cell stack that includes a separator stack located in between an anode side and a cathode side; a mixed gas conduit for receiving a mixed gas stream to the anode side; an anode removal conduit for removing a helium rich stream from the anode side; and a cathode removal conduit for removing a hydrogen rich stream from the cathode side. The separation stack includes a plurality of electrochemical cells, each of which includes a proton exchange membrane located in between an anode and a cathode. The proton exchange membrane can include a cation. The separation stack can be a cascading separation stack.

In another aspect, a method for removing hydrogen from a mixed gas includes introducing a mixed gas stream to an anode side of an electrochemical cell stack and electrochemically separating the hydrogen from the mixed gas stream to form a helium rich stream on the anode side and a hydrogen rich stream on the cathode side. The mixed gas stream includes hydrogen, helium, and an additional gas. The electrochemical cell stack includes a separator stack located in between the anode side and a cathode side. The separation stack includes a plurality of electrochemical cells, each of which includes a proton exchange membrane located in between an anode and a cathode. The proton exchange membrane can include a cation. The separation stack can be a cascading separation stack.

The above described and other features are exemplified by the following figures, detailed description, and claims.

BRIEF DESCRIPTION OF THE DRAWINGS

The figures are exemplary aspects, wherein the like elements are numbered alike.

DETAILED DESCRIPTION

Figures 1, 2, 3:
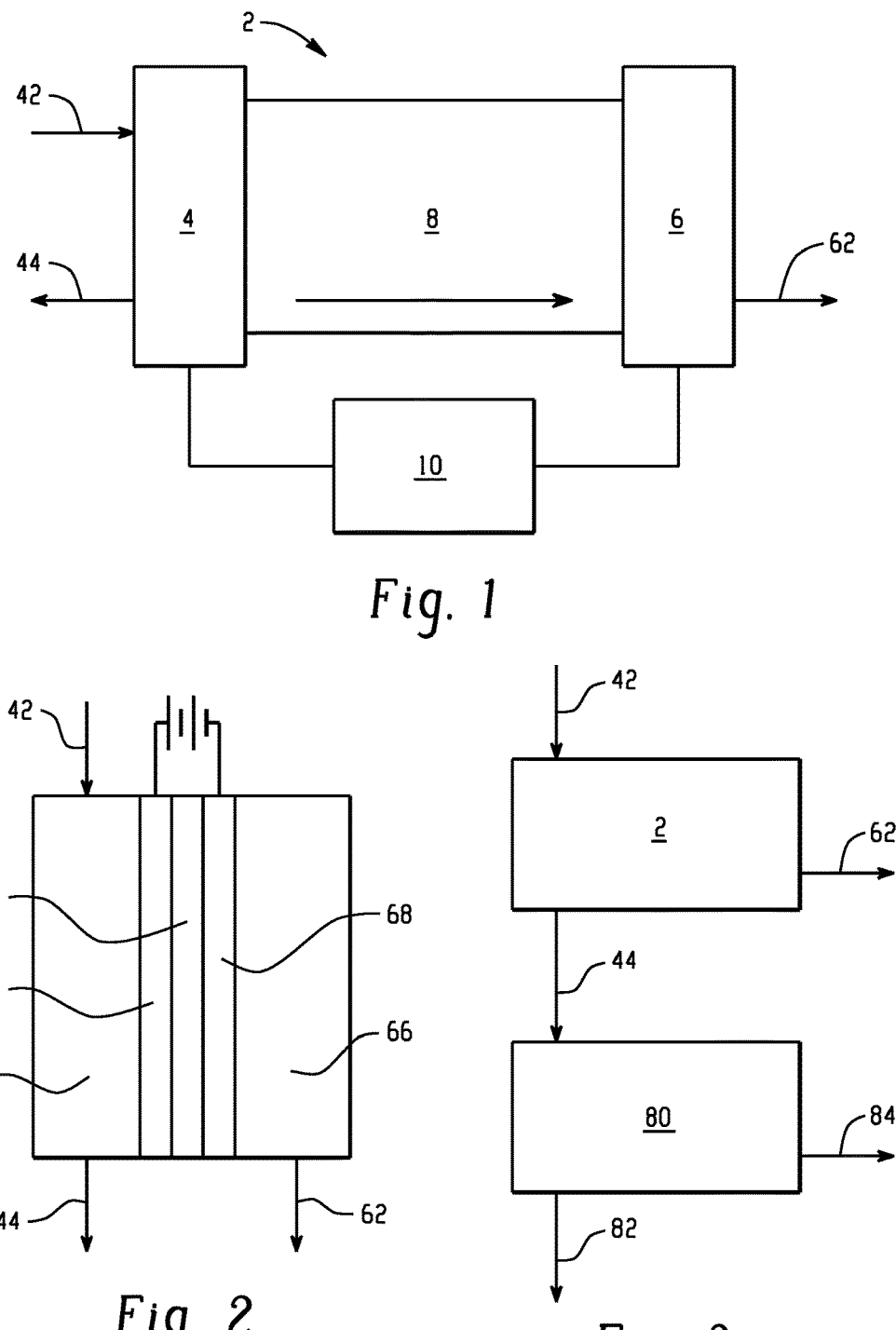
FIG. 1 is an illustration of an aspect of a hydrogen separation unit.
FIG. 2 is an illustration of an aspect of an electrochemical cell.
FIG. 3 is an illustration of an aspect of a method of purifying helium from mixed gas.

Although separation of two component streams of hydrogen and helium has been performed using electrochemical separation processes, separation of hydrogen from mixed gas streams comprising more than the two components is operationally more difficult owing to the complex nature of the system. It was discovered that by modifying one or more features of a hydrogen separation unit, the hydrogen separation unit could be efficiently used to separate hydrogen from a mixed gas, including 1) adding a cation to the proton exchange membrane to reduce or prevent the transport of helium therethrough; 2) modifying the current through the electrochemical cells based on varying concentration of the mixed gas; or 3) using a cascade arrangement of or within the separator stacks. Each of these steps, alone or together, can affect a higher removal of hydrogen from the mixed gas stream, ultimately resulting in a helium-rich stream having a higher concentration of helium. As used herein, the term mixed gas refers to a gas stream comprising helium, hydrogen, and at least one other gas.

Helium from the helium-rich stream can then be further separated to obtain a helium product stream. By first separating hydrogen from the mixed gas, a helium-rich stream (comprising an increased percentage of helium) can be introduced to traditional helium separation processes to affect a more efficient helium separation, ultimately producing a purer helium product stream.

The mixed gas can comprise 0.5 to 80 volume percent, or 10 to 80 volume percent, or 0.01 to 10 volume percent of helium based on the total volume of the mixed gas. The mixed gas can comprise 10 to 45 volume percent, or 10 to 20 volume percent, or 45 to 75 volume percent of hydrogen based on the total volume of the mixed gas. In addition to the hydrogen and helium, the mixed gas can comprise at least one of a $C_{1-5}$ alkane (for example, methane, ethane, propane, butane, or pentane), carbon dioxide, hydrogen sulfide, nitrogen, argon, oxygen, or water. The mixed gas can comprise a natural gas.

FIG. 1 and FIG. 2 illustrate a process for the separation of hydrogen from mixed gas. As shown in FIG. 1, an electrochemical cell stack 2 comprises a separator stack 8, an anode side 4, and a cathode side 6. The separator stack comprises a plurality of individual electrochemical cells. As is shown in FIG. 2, each electrochemical cell individually comprises a proton exchange membrane 50 with an anode 48 and a cathode 68 disposed on opposite surfaces of the proton exchange membrane 50. The cells can be arranged as modules in a stack, separated by interconnects that can provide flow field structures for fluid flow on each side of the membrane as well as an electrical connection between the cells to provide electrical current flow in the stack. The cells in the separator stack 8 can be connected in series electrically, with fluid flow distributed into or collected from the stack by header passages that are in fluid communication with the stack inlets and outlets. It should be appreciated that each of the electrochemical cells or stacks can include further components as is known in the art. These additional components can include, for example, gas diffusion layers, current collectors and the like.

Accordingly, the separator stack 8 can represent a plurality of proton exchange membranes arranged in a modular stack configuration, with interspaced interconnect/separator plates that separate the cathode-side and anode-side flow paths of adjacent cells, with the electrodes of the cells connected in series through the interconnect/separator plates. The anode side 4 of the electrochemical cell stack 2 can represent anode-side electrical connections to the cell stack (e.g., an anode bus), and an anode-side manifold that collects gas from and distributes gas to the anode side of the cell stack. The cathode side 6 of the electrochemical cell stack 2 can represent cathode-side electrical connections to the cell stack (e.g., a cathode bus), and a cathode-side manifold that collects gas from and distributes gas to the cathode side of the cell stack. Flow field structures (not shown) can be disposed on either side of the proton exchange membrane(s) in the electrochemical cell stack 2. These structures are typically disposed distal from the respective membrane(s), with the membrane(s) and the flow field structures each mounted in a frame assembly (not shown), to provide space for fluid flow in contact with the membrane.

In the case of separator stack 8, as hydrogen is removed from the mixed gas stream 42 due to oxidation on the anodes within the separator stack 8, the velocity of the mixed gas stream 42 can decrease. This reduction in the velocity can lead to a maldistribution of the remaining mixed gas and inefficient operation of the electrochemical cells. It was discovered that when the separator stack 8 comprises a cascading stack, whereby the stack is partitioned to maintain consistent gas velocity in a cell, the performance of the electrochemical cell stack 2 can be improved. The cascading stack can be configured to manage decreasing gas flow velocity due to removal of, or reaction of constituents within a gas stream. For example, downstream sections of the cascading stack can consist of a reduced number of cells as compared to the preceding section. An optimized cell design of the cascading stack can ensure that a sufficient velocity is maintained near the exit of the electrochemical cell stack 2 to prevent localized starvation of hydrogen at the anodes. This configuration can reduce the amount of hydrogen lost at the anode exhaust as the remaining constituents are removed from the cell in the helium rich stream 44.

The cascading stack can comprise a cascade within a single cell stack, or it can comprise multiple cell stacks. When a single cell stack is present, the cascading stack can be designed such that the flow of the mixed gas stream 42 proceeds in series through different partitions created within the cascading stack, with each partition sized to maintain a minimum gas velocity through each of the cells within the partition. By way of an example, a 50-cell stack assembly could be partitioned in three sections—the first section contains 30 cells, the second 15 cells, and the final 5 cells. The sizing of the partitions can be dictated by flow velocity requirements, which can be governed by the gas composition and the mixed gas stream 42 enter ng the electrochemical cell stack. For example, the first section of the separator stack 8 can consist of a first number of cells, for example, 60 to 100 cells, and the second, downstream section of the separator stack 8 can consist of a lesser amount of cells as compared to the first section, for example, 20 to 55 cells. The helium rich stream from the first set of cells can be directed through a partition to the second set of cells.

In a multi-cell stack arrangement, the hulk separation of hydrogen from the gas mixture can be completed in a first stack assembly. The anode exhaust from this first bulk separation stack can be fed to a second, smaller stack assembly to pump additional hydrogen. In the case of hydrogen/helium separation, this approach can allow pressurization of the anode exhaust with a mechanical compressor prior to introduction into a 'polishing' stack that removes additional hydrogen from the gas stream, leaving a pressurized helium rich stream 44 that is essentially free of hydrogen. The single stack approach can be beneficial as it can reduce procurement cost for the system as one set of compression hardware would be needed, but it is noted that the stack would thereby be designed to have each partition at the same current density.

A power supply 10 capable of operating as a power source can be directly or indirectly electrically connected through electrical circuits to electrical connections of the anode side 4 and the cathode side 6. During operation, a mixed gas stream 42 comprising a mixed gas is fed to the anode side 4, and the electrochemical cell stack 2 operates as a hydrogen pump delivering electrons to the power supply 10. Hydrogen is ionized in the separator stack 8 by the anode and converted to hydrogen ions (protons), which are separated from any other components of the mixed gas by transportation through the proton exchange membrane(s) as represented by arrow in the separator stack 8. Hydrogen molecules are then formed from the hydrogen ions and the electrons provided by the power supply 10 to form a hydrogen-rich stream 62 at the cathode side 6 of the electrochemical cell stack 2. The remaining gas comprising helium is then removed from the anode side 4 as helium-rich stream 44 for use or for further purification.

The illustration of the electrochemical cell in FIG. 2 shows that the mixed gas stream 42 enters an anode chamber 46. A water stream, not shown, can be supplied to a cathode chamber 66 or water, as a vapor, can be provided in the mixed gas stream 42 and a potential can be applied across the anode 48 and the cathode 68. Hydrogen is oxidized at the anode 48 according to reaction (1).

$$H_2 \rightarrow 2H^+ + 2e^- \qquad (1)$$

The protons formed from the reaction (1) can be driven across the proton exchange membrane 50 due to the polarity of the voltage applied and the electrons formed from reaction (1) can be bussed through an external circuit by the power supply 10.

The protons driven through the proton exchange membrane 50 can then be combined at the cathode 68 of the membrane and electrode assembly with the electrons being bussed from the external circuit by the power supply 10 by the electrochemical reaction (2).

$$2H^+ + 2e^- \rightarrow H_2 \qquad (2)$$

The throughput rate of hydrogen in the separator stack 8 is proportional to the electrical current at which the cell is run. The electrical current per unit active area is referred to as current density. Cell configurations with lower effective electrical resistance can be operated at higher current densities and are thus more efficient and cost effective. The bulk of the effective electrical resistance is contributed by the Ohmic resistance of the proton conducting membranes in the cells. The proton conductivity of this material is strongly influenced by its water content. Fully hydrated membranes are dramatically more conductive to protons than dry membranes.

In low-pressure electrochemical cell stacks, there are highly effective means of maintaining the hydration of the membranes, for example, by circulating liquid water on the product side of the cells. The circulating of liquid water imparts a two-phase flow out of the cathode of the stack. This water/hydrogen mixture can be sent to a phase separator and the liquid can be cycled back to the cathode inlet. This circulating water loop can also be used for cooling purposes.

The system can comprise a controller (not shown) in communication (e.g., via an electronic signal) with the electrochemical cell stack 2 and the mixed gas stream 42, specifically in communication with the power supply 10, and with other process control components such as pumps, heat exchangers, pressure control valves, or fluid control valves. The controller 70 can be configured to determine the concentration of the hydrogen in the mixed gas stream 42.

The proton exchange membranes in the respective cells have been catalyzed to facilitate the oxidation and reduction of hydrogen. In each cell, the proton exchange membrane itself acts as a barrier—allowing the transport of protons across their thickness from the anode (feed side) to the cathode (discharge side)—rejecting other constituents present in the feed gas stream. The proton exchange membrane is generally only conductive to protons when it is hydrated; unfortunately, hydrating the proton exchange membrane can also allow undesirable permeation of some constituents in the anode feed stream (for example, from the mixed gas stream 42) to the product cathode stream (for example, the hydrogen rich stream 62), adversely impacting the purity of the hydrogen in the hydrogen rich stream 62. The maximum electrical performance of the electrochemical hydrogen pump stack can be achieved when the membrane is fully in the acid form; i.e. the sulfonic acid groups in the proton exchange membrane are fully protonated as the hydrogen ion is capable of coordinating significant water around the sulfonic acid groups.

It was discovered that in order to reduce the amount of helium crossover and to maximize the concentration of the helium in the helium-rich stream, permeation of helium through the proton exchange membrane could be reduced by replacing at least some of the protons in the proton exchange membrane with a cation while maintaining good electrical performance. It was discovered that by replacing the protons with different cations such as lithium, sodium, potassium, magnesium, or nickel, the amount of water that can be coordinated is reduced and that this reduction in membrane water content can reduce the permeability of the membrane to helium, allowing for an increased concentration of the helium in the helium rich stream 44. It is noted that the fact that ionic conductivity in the modified proton exchange membrane remained high was surprising as it was expected that exchanging an amount of the protons with different cations could result in a decrease in the ionic transport characteristics across the proton exchange membrane.

The modified proton exchange membrane can be prepared by immersing a proton exchange membrane in a cation solution. The cation solution can have a cation concentration of 0.1 to 10 millimolar. The cation can comprise at least one of lithium, sodium, potassium, magnesium, nickel, calcium, cobalt, or cesium. The concentration of the cation in the modified proton exchange membrane can be dependent upon the concentration of the cation in the cation solution, solution temperature, and the immersion time. The concentration of the cation can vary in the respective proton exchange membranes 50 based on their respective locations in the separator stack 8. For example, if a cascading separator stack is used then the proton exchange membranes 50 located near the anode side 4 can have a lower concentration of the cation than the proton exchange membranes 50 located near the cathode side 6, in this manner, the increased, average concentration of the cation in the second portion of the proton exchange membranes 50 can help to prevent helium crossover in the more highly concentrated mixed gas stream in these proton exchange membranes 50.

The immersing of the proton exchange membrane in the cation solution can result in the proton exchange membrane taking up the cation in an amount of up to 90%, or 10 to 30% of the total sites with the cation based on the total sites available for cation exchange prior to the cation being introduced by the immersing.

The proton exchange membrane can comprise an electrolyte such as at least one of a proton conducting ionomer or an ion exchange resin. The proton conducting ionomer can comprise a polymer complexed with at least one of an alkali metal salt, an alkali earth metal salt, a protonic acid, or a protonic acid salt. The complexed polymer can comprise at least one of a polyether, polyester, polyimide, or a polyoxyalkylene (such as poly(ethylene glycol), polyethylene glycol monoether), or polyethylene glycol diether)).

The proton exchange membrane can comprise an ionomer-type polyelectrolyte comprising an amount of ionic groups on a hydrophobic backbone or on pendent groups off of the hydrophobic backbone such as a hydrocarbon- and fluorocarbon-type resin. The hydrocarbon-type ion-exchange resin can comprise at least one of a phenolic resin or a polystyrene. The hydrocarbon-type ion-exchange resin can be sulfonated, for example, a sulfonated poly(xylylene oxide). The hydrocarbon-type ion-exchange resin can comprise a proton conducting molecule, for example, at least one of a fullerene molecule, a carbon fiber or a carbon nanotube. The proton conducting molecules can comprise proton dissociation groups, for example, at least one of $-OSO_3H$, $-OPO(OH)_2$, $-COOH$, $-SO_3H$, $-C_6H_4$, $-SO_3H$, or $-OH$. The proton conducting molecules alone can form the proton exchange membrane or can be present as a mixture with a binder polymer such as at least one of a fluoropolymer (for example, polyfluoroethylene or poly(vinyldiene fluoride)) or polyvinyl alcohol), As oxygen is not present in a significant amount in the proton exchange membrane, the concern for oxidation is low, and the proton exchange membrane can comprise a hydrocarbon-type ion-exchange resin.

The fluorocarbon-type ion-exchange resin can include a hydrate of at least one of tetrafluoroethylene-perfluorosulfonyl ethoxyvinyl ether or tetrafluoroethylene-hydroxylated (perfluoro vinyl ether) copolymer. The fluorocarbon-type ion-exchange resin can have at least one of a sulfonic, a carboxylic, or a phosphoric acid functionality. The fluorocarbon-type ion-exchange resin can be a sulfonated fluoropolymer (such as a lithium salt of perfluoroethylene sulfonic acid). An example of fluorocarbon-type ion-exchange resin is NAFION that is commercially available from DuPont.

The electrodes (anode 48 and/or cathode 68) can be in direct physical contact Leith the proton exchange membrane 50 and can cover 90 to 100% of the respective surface areas of the proton exchange membrane 50. Each electrode independently comprises a catalyst layer. The catalyst layer can comprise at least one of platinum, palladium, rhodium, carbon, gold, tantalum, tungsten, ruthenium, iridium, osmium, or silver. The catalyst can comprise a bound catalyst. The binder can comprise at least one of a fluoropolymer or a particulate carbon. The catalyst and optional binder can be deposited directly onto the surfaces of the proton exchange membrane. The catalyst can be disposed on a gas diffusion layer such that it is located throughout the gas diffusion layer or on a surface of the gas diffusion layer that is in contact with the proton exchange membrane. The gas diffusion layer can be porous. The gas diffusion layer can be a mesh. The gas diffusion layer can comprise a graphitic material. The gas diffusion layer can comprise a plurality of fibers such as carbon fibers. The gas diffusion layer can be electrically conductive.

FIG. 3 illustrates the helium rich stream 44 can be directed to a helium separation unit 80. The helium separation unit 80 can separate the helium-rich stream 44 into a helium-product stream 82 and a helium-poor stream 84. The helium product stream 82 can comprise greater than or equal to 90 volume percent, or 95 to 100, or 99 to 100 volume percent of helium based on the total volume of the helium product stream 82. The helium separation unit 80 can comprise at least one of a pressure swing adsorption unit, a membrane separator, or the like.

At least one of the helium rich stream 44 or the helium product stream 82 can be directed to a mechanical compressor. The mechanical compressor can compress the helium gas to a pressure of as much as 7,500 pounds per square inch gauge (psig) (51.7 megapascal (MPa)), or as much as 5,000 psig (34.5 MPa), or as much as 3,000 psig (20.7 MPa).

The hydrogen-rich stream 62 can he at ambient pressure or at an increased pressure. For example, a back-pressure valve can be used to increase the pressure of the hydrogen-rich stream 62 or the hydrogen-rich stream 62 can be directed to a vessel and filled to an increased pressure. The increased pressure of the hydrogen-rich stream can be as much as 13,000 psig (89.6 MPa), or as much as 6,500 psig (44.8 MPa), or as much as 4,500 psig (31 MPa). The lower limit of the increased pressure stream is not particularly limited and can be greater than the ambient pressure. In general, the lower limit can be based on downstream equipment that provides additional pressure drops.

Set forth below are non-limiting aspects of the present disclosure.

Aspect 1: A hydrogen separation unit comprising: an electrochemical cell stack comprising a separator stack located in between an anode side and a cathode side; a mixed gas conduit for receiving a mixed gas stream to the anode side; an anode removal conduit for removing a helium rich stream from the anode side; a cathode removal conduit for removing a hydrogen rich stream from the cathode side; wherein the separation stack comprises a plurality of electrochemical cells, each of which comprises a proton exchange membrane located in between an anode and a cathode; wherein at least one of the proton exchange membrane comprises a cation, or the separation stack is a cascading separation stack.

Aspect 2: The hydrogen separation unit of Aspect 1, the proton exchange membrane comprises the cation.

Aspect 3: The hydrogen separation unit of any one or more of the preceding aspects, wherein the cation comprises at least one of lithium, sodium, potassium, magnesium, nickel, calcium, cobalt, or cesium.

Aspect 4: The hydrogen separation unit of any one or more of the preceding aspects, wherein the cation can take up to 90%, or 10 to 30% of the total sites available for cation exchange prior to the cation being introduced.

Aspect 5: The hydrogen separation unit of any one or more of the preceding aspects, wherein the separation stack is a cascading separation stack.

Aspect 6: The hydrogen separation unit of any one or more of the preceding aspects, wherein the separation stack is a cascading separation stack comprising a first portion of cells and a second portion of cells, wherein a first portion helium rich stream from the first portion of cells is in fluid communication with the second portion of cells.

Aspect 7: The hydrogen separation unit of Aspect 6, wherein an average cation concentration in the proton exchange membranes in the first portion of cells is less than an average cation concentration in the proton exchange membranes in the second portion of cells.

Aspect 8: The hydrogen separation unit of any one or more of the preceding aspects, further comprising a helium separation unit in fluid communication with the helium rich stream; wherein the helium separation unit comprises a helium conduit for removing a helium product stream from the helium separation unit.

Aspect 9: The hydrogen separation unit of Aspect 9, wherein the helium separation unit is a pressure swing adsorption unit or a membrane separation unit.

Aspect 10: A method for removing hydrogen from a mixed gas comprising: introducing a mixed gas stream to an anode side of an electrochemical cell stack; wherein the mixed gas stream comprises hydrogen, helium, and an additional gas; wherein the electrochemical cell stack comprises a separator stack located in between the anode side and a cathode side; and electrochemically separating the hydrogen from the mixed gas stream to form a helium rich stream on the anode side and a hydrogen rich stream on the cathode side; wherein the separation stack comprises a plurality of electrochemical cells, each of which comprises a proton exchange membrane located in between an anode and a cathode; wherein at least one of the proton exchange membrane comprises a cation, or the separation stack is a cascading separation stack. The method can utilize the hydrogen separation unit of any one or more of the preceding aspects.

Aspect 11: The method of Aspect 10, wherein the proton exchange membrane comprises the cation.

Aspect 12: The method of any one or more of Aspects 10 to 11, wherein the cation comprises at least one of lithium, sodium, potassium, magnesium, nickel, calcium, cobalt, or cesium.

Aspect 13: The method of anyone or more of Aspects 10 to 12, wherein the cation can take up to 90%, or 10 to 30% of the total sites available for cation exchange prior to the cation being introduced.

Aspect 14: The method of any one or more of Aspects 10 to 13, wherein the separation stack is the cascading separation stack.

Aspect 15: The method of any one or more of Aspects 10 to 14, wherein the separation stack is the cascading separation stack comprising a first portion of cells and a second portion of cells, wherein the method comprises directing a first portion helium-rich stream from the first portion of cells to the second portion of cells.

Aspect 16: The method of Aspect 15, wherein an average cation concentration in the proton exchange membranes in the first portion of cells is less than an average cation concentration in the proton exchange membranes in the second portion of cells.

Aspect 17: The method of any one or more of the preceding aspects, further comprising directing the helium-rich stream to a helium separation unit.

Aspect 18: The method of Aspect 17, wherein the helium separation unit is a pressure swing adsorption unit or a membrane separation unit.

Aspect 19: The method of any one or more of the preceding aspects, further comprising mechanically compressing the helium rich stream downstream of the electrochemical cell stack to form a helium rich stream having an increased pressure.

Aspect 20: The method of any one or more of the preceding aspects, further comprising increasing the pressure of the hydrogen-rich stream downstream of the electrochemical cell stack.

Aspect 21: The hydrogen separation unit of any one or more of the preceding aspects, further comprising a mechanical compressor in fluid communication with the helium rich stream downstream of the electrochemical cell stack configured to increase the pressure of the helium rich stream.

Aspect 22: The hydrogen separation unit of any one or more of the preceding aspects, further comprising a back-pressure valve in fluid communication with the hydrogen-rich stream downstream of the electrochemical cell stack configured to increase the pressure of the hydrogen-rich stream.

Aspect 23: The hydrogen separation unit of any one or more of the preceding aspects, further comprising a vessel in fluid communication with the hydrogen-rich stream downstream of the electrochemical cell stack configured to increase the pressure of the hydrogen-rich stream.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term means "and/or" unless clearly indicated otherwise by context. Reference throughout the specification to "an aspect", "another aspect", "some aspect", and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects. The suffix "(s)" as used herein is intended to include both the singular and the plural of the term that it modifies, thereby including e or more of that term (e.g., the colorant(s) includes one or more colorants).

When an element such as a layer, film, region, or substrate is referred to as being "on" another element, it can be directly on the other element or intervening elements may also be present. In contrast, when an element is referred to as being "directly on" another element, there are no intervening elements present.

The endpoints of all ranges directed to the same component or property are inclusive of the endpoints, are independently combinable, and include all intermediate points and ranges. For example, ranges of "up to 25 vol %, or 5 to 20 vol %" is inclusive of the endpoints and all intermediate values of the ranges of "5 to 25 vol %," such as 10 to 23 vol %, etc.

The term "at least one of" means that the list is inclusive of each element individually, as well as combinations of two or more elements of the list, and combinations of at least one element of the list with like elements not named. Also, the term "combination" is inclusive of blends, mixtures, alloys, reaction products, and the like.

Unless defined otherwise, technical and scientific terms used ere have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A hydrogen separation unit comprising:
an electrochemical cell stack comprising a separator stack located in between an anode side and a cathode side;
a mixed gas conduit for receiving a mixed gas stream to the anode side;
an anode removal conduit for removing a helium rich stream from the anode side; and
a cathode removal conduit for removing a hydrogen rich stream from the cathode side;
wherein the separator stack comprises a plurality of electrochemical cells, each of which comprises a proton exchange membrane located in between an anode and a cathode; and
wherein at least one of
the proton exchange membrane comprises a cation other than H+, or
the separator stack is a cascading separation stack partitioned to maintain consistent gas velocity.

2. The hydrogen separation unit of claim 1, wherein the proton exchange membrane comprises the cation.

3. The hydrogen separation unit of claim 1, wherein the cation comprises at least one of lithium, sodium, potassium, magnesium, nickel, calcium, cobalt, or cesium.

4. The hydrogen separation unit of claim 1, wherein the cation can take up to 90% of the total sites available for cation exchange prior to the cation being introduced.

5. The hydrogen separation unit of claim 1, wherein the separator stack is the cascading separation stack.

6. The hydrogen separation unit of claim 1, wherein the separator stack is the cascading separation stack comprising a first portion of cells and a second portion of cells, wherein a first portion helium rich stream from the first portion of cells is in fluid communication with the second portion of cells.

7. The hydrogen separation unit of claim 6, wherein an average cation concentration in the proton exchange membranes in the first portion of cells is less than an average cation concentration in the proton exchange membranes in the second portion of cells.

8. The hydrogen separation unit of claim 1, further comprising a helium separation unit in fluid communication with the helium rich stream;
wherein the helium separation unit comprises a helium conduit for removing a helium product stream from the helium separation unit.

9. The hydrogen separation unit of claim 8, wherein the helium separation unit is a pressure swing adsorption unit or a membrane separation unit.

10. The hydrogen separation unit of claim 1, further comprising a mechanical compressor in fluid communication with the helium rich stream downstream of the electrochemical cell stack configured to increase the pressure of the helium rich stream.

11. The hydrogen separation unit of claim 1, further comprising a back-pressure valve or a vessel in fluid communication with the hydrogen-rich stream downstream of the electrochemical cell stack configured to increase the pressure of the hydrogen-rich stream.

\* \* \* \* \*